United States Patent Office.

WILHELM ACKERMANN, OF GIEBICHENSTEIN, NEAR HALLE-ON-THE-SAALE, ASSIGNOR TO GRABAU'S ALUMINIUM-WERKE, OF TROTHA, NEAR HALLE-ON-THE-SAALE, GERMANY.

PROCESS OF MAKING ALUMINUM FLUORIDE.

SPECIFICATION forming part of Letters Patent No. 508,796, dated November 14, 1893.

Application filed December 23, 1892. Serial No. 456,151. (No specimens.) Patented in Belgium August 20, 1892, No. 101,023.

*To all whom it may concern:*

Be it known that I, WILHELM ACKERMANN, a subject of the German Emperor, residing at Giebichenstein, near Halle-on-the-Saale, Germany, have invented certain new and useful Improvements in and Relating to the Production of Aluminum Fluoride; and I do hereby declare the following to be a full, clear, and exact description of the invention, and for which I have obtained a patent in Belgium, No. 101,023, August 20, 1892.

My invention has relation to the production of aluminum fluorid, and has for its object a process by means of which a solution of aluminum fluorid free from silicious bodies is obtained.

In order to obtain fluorid of aluminum free from silicious bodies and iron, for the purpose of obtaining pure aluminum, it is necessary to first obtain a solution of fluorid of aluminum free from such silicious bodies. This solution can be obtained from the cheapest raw materials by means of the process forming the subject matter of this invention, as follows:

I treat pulverized and suitably calcined clay or kaolin, as poor in iron as possible, with a solution of hydrofluoric acid, preferably containing about twelve per cent. of the acid, or a solution of hydrofluosilicic acid of about the same strength, in such proportions that there will be a moderate excess, about fifteen per cent., of calcined clay or kaolin. When hydrofluoric acid is employed a more or less violent reaction under evolution of heat ensues, and the temperature should be kept down by a suitable cooling agent, preferably to about 95° centigrade, and should never be allowed to reach the boiling point. When, on the contrary, hydrofluosilicic acid is employed, the reaction is much more moderate, and may be stimulated or increased by the application of heat until the mixture has attained about 95° centigrade. The mixture becomes neutral in a very short time, in fact, in a few minutes, which may readily be ascertained by a test with tropœolin, the neutralization being complete when the test shows a pure yellow color. The absence of soluble silicious bodies from the liquid is conditioned upon this neutralization; as so long as the mixture is not neutral it is evidence of the presence of hydrofluosilicic acid, while the complete separation of the silicic acid hydrate in an insoluble form will not take place except in a neutral or slightly basic solution. When a certain quantity of calcined clay or kaolin is introduced into hydrofluoric acid the reaction takes place according to the following equation:

I.  $Al_2O_3 + H_2SiO_3 + 12HFl = Al_2Fl_6 + H_2SiFl_6 + 6H_2O,$ the silicious body being here obtained in a soluble form; but if sufficient calcined clay or kaolin is introduced into this solution the hydrofluosilicic acid formed will be decomposed in such manner that said hydrofluosilicic acid will be neutralized by the clay or kaolin and the silicic acid in an insoluble form will be separated according to the following equation:

II. 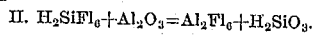 $H_2SiFl_6 + Al_2O_3 = Al_2Fl_6 + H_2SiO_3.$

In order to insure that the solution obtained according to this equation does not contain silicious matter in a soluble form, the excess of clay or kaolin to be added thereto will be generally about fifteen per cent.

From the above it is obvious that instead of hydrofluoric acid, hydrofluosilicic acid may be employed as above stated for the conversion of the clay or kaolin, since the entire procedure rests finally upon the conversion into insoluble silicic acid of the hydrofluosilicic acid contained or formed in the solution. Inasmuch as artificial heat is required when hydrofluosilicic acid is employed as above stated, I prefer to use hydrofluoric acid, for the reason that the reaction last referred to will take place without artificial heat. The hot neutral mixture obtained as above described is now cooled down to a medium temperature and rapidly filtered. The fluorid of aluminum solution remaining in the residue which is composed of silicic acid hydrate and undecomposed clay, is removed therefrom by lixiviation in hot water, and this wash water can be used in subsequent operations until it is sufficiently concentrated. I have found that in the described process about ninety-five per cent. of the hydrofluoric acid is recovered in the form of dissolved fluorid of aluminum.

Practice has demonstrated that it is not possible to obtain a neutral solution with uncalcined clay or kaolin, even after prolonged heating of the mixture of clay or kaolin and acid, and in this operation a large proportion, as high as fifty per cent. of the aluminum fluorid in an insoluble form passes over into the residue and is lost. Practice has also demonstrated that the clay or kaolin should be of a proper degree of calcination, as it is difficult to obtain a neutral solution free from silicious bodies with clay or kaolin that is either too much or too little calcined. The proper degree of calcination of the clay or kaolin may, however, be readily determined by ascertaining whether neutralization takes place when a sample of the calcined clay or kaolin is treated with hydrofluoric acid as above described.

Having thus described my invention, what I claim as new therein, and desire to secure by Letters Patent, is—

The production of fluorid of aluminum solutions free from silicious bodies, which consists in treating a sufficient quantity of a suitably calcined silicate of aluminum with an acid, as hydrofluoric acid, whereby the silicon in the silicate is converted into insoluble silicic acid, and separating the fluorid of aluminum solution from said insoluble silicic acid, substantially as described.

WILHELM ACKERMANN.

Witnesses:
RICHARD SCHMIDT,
PAUL LOUBIER.